US008532473B2

(12) United States Patent
Shibamiya et al.

(10) Patent No.: US 8,532,473 B2
(45) Date of Patent: Sep. 10, 2013

(54) REPRODUCTION CONTROL METHOD, REPRODUCTION APPARATUS, AND TELEVISION SET

(75) Inventors: Yoshikazu Shibamiya, Tokyo (JP); Atsushi Mizutome, Miura-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 1300 days.

(21) Appl. No.: 11/917,240

(22) PCT Filed: Aug. 15, 2006

(86) PCT No.: PCT/JP2006/316032
§ 371 (c)(1),
(2), (4) Date: Dec. 12, 2007

(87) PCT Pub. No.: WO2007/020919
PCT Pub. Date: Feb. 22, 2007

(65) Prior Publication Data
US 2009/0116821 A1    May 7, 2009

(30) Foreign Application Priority Data

Aug. 15, 2005    (JP) .................................. 2005-235239

(51) Int. Cl.
*H04N 5/93*    (2006.01)
*H04N 5/783*    (2006.01)
(52) U.S. Cl.
USPC .......................................... 386/353; 386/352
(58) Field of Classification Search
USPC .................................................. 386/353, 352
See application file for complete search history.

(56) References Cited

U.S. PATENT DOCUMENTS

| 5,633,683 | A | 5/1997 | Rosengren et al. ........... 348/385 |
| 6,041,068 | A | 3/2000 | Rosengren et al. ........... 370/538 |
| 6,741,617 | B2 | 5/2004 | Rosengren et al. ........... 370/536 |
| 6,795,130 | B2 | 9/2004 | Shibamiya ..................... 348/734 |
| 7,742,681 | B2 * | 6/2010 | Yamagata et al. ............. 386/258 |
| 2002/0047914 | A1 | 4/2002 | Rosengren et al. ........ 348/384.1 |
| 2002/0138829 | A1 | 9/2002 | Matsumoto et al. ............ 725/14 |
| 2002/0157094 | A1 | 10/2002 | Saito et al. ....................... 725/38 |
| 2003/0208778 | A1 | 11/2003 | Aratani et al. ................. 725/139 |
| 2004/0049788 | A1 | 3/2004 | Mori et al. ....................... 725/58 |

(Continued)

FOREIGN PATENT DOCUMENTS

| EP | 0 755 604 B1 | 1/2000 |
| JP | 9-512148 | 12/1997 |

(Continued)

OTHER PUBLICATIONS

Toru Yamada, et al., "Proposal of Copy Control Method Restoring the Original Data After Move Operation With Data Transform", IEICE Technical Report, Jun. 10, 2005, vol. 105, No. 112, pp. 31-36 (with translation).

(Continued)

*Primary Examiner* — Kambiz Zand
*Assistant Examiner* — Benjamin Kaplan
(74) *Attorney, Agent, or Firm* — Fitzpatrick, Cella, Harper & Scinto

(57) ABSTRACT

A reproduction control method includes steps of converting first program data accumulated in a first apparatus into second program data reproducible in a second apparatus, transferring the converted second program data to the second apparatus, and converting the first program data accumulated in the first apparatus into reconstructable reproduction-disabled data.

22 Claims, 8 Drawing Sheets

(56) References Cited

U.S. PATENT DOCUMENTS

| | | | |
|---|---|---|---|
| 2004/0078472 A1 | 4/2004 | Mizutome et al. | 709/227 |
| 2004/0117830 A1 | 6/2004 | Ohno et al. | 725/51 |
| 2004/0148629 A1 | 7/2004 | Shibamiya et al. | 725/53 |
| 2005/0084241 A1 | 4/2005 | Ishibashi et al. | 386/83 |
| 2005/0086505 A1 | 4/2005 | Ishibashi et al. | 713/193 |
| 2005/0160462 A1 | 7/2005 | Shikata et al. | 725/58 |
| 2005/0169685 A1 | 8/2005 | Matsubayashi et al. | 400/62 |
| 2005/0281540 A1 | 12/2005 | Inokuchi et al. | 386/94 |
| 2007/0188659 A1 | 8/2007 | Matsumoto et al. | 348/571 |

FOREIGN PATENT DOCUMENTS

| | | |
|---|---|---|
| JP | 11-146378 | 5/1999 |
| JP | 2002-290905 | 10/2002 |
| JP | 2002-319227 | 10/2002 |
| JP | 2003-259333 A | 9/2003 |
| JP | 2004-159316 A | 6/2004 |
| JP | 2005-158233 | 6/2005 |
| JP | 2006-004543 | 1/2006 |
| WO | WO 95/28794 | 10/1995 |

OTHER PUBLICATIONS

Translation of International Preliminary Report on Patentability in PCT/JP2006/316032.

* cited by examiner

REPRODUCTION CONTROL METHOD, REPRODUCTION APPARATUS, AND TELEVISION SET

TECHNICAL FIELD

The present invention relates to a reproduction control method, reproduction apparatus, and television set for program data reproduction and, more particularly, to a reproduction control method for copyrighted content data.

BACKGROUND ART

Japanese Patent Laid-Open No. 2002-290905 discloses a technique of safely and reliably transferring contents.

Japanese Patent Laid-Open No. 2002-290905 discloses a digital broadcast reception apparatus and an information recording/reproduction apparatus, which can execute reliable transfer (copy and erase of original data) of a transport stream to an external storage device and prevent data from being copied halfway.

Japanese Patent Laid-Open No. 2002-319227 discloses that "Copy One Generation" literally indicates permitting to copy information of one generation, unlike "Copy Once" that permits copy only once, and a user can simultaneously record a content of "copy one generation" in two apparatuses.

Japanese Patent Laid-Open No. 11-146378 discloses a "digital broadcast system that enables saving and viewing of unrecordable digital broadcast data".

DISCLOSURE OF INVENTION

Problem that the Invention is to Solve

Japanese Patent Laid-Open No. 2002-290905 assumes erase of an entire original content of copy source. Japanese Patent Laid-Open No. 2002-319227 discloses a technique of temporarily enabling copy of a content of "copy one generation", although the technique cannot be applied to a copy-protected content. In Japanese Patent Laid-Open No. 11-146378, a received copy-protected content is recorded at a degraded image quality so it cannot be viewed at a high image quality.

<Copy>

As is understood traditionally, general TV programs can be copied privately at a degraded image quality. Along with the recent spread of media digitization and networks such as the Internet, high-quality copies of digital contents can easily be produced without any degradation. The broadcaster side is demanding to protect copyright holders from such rampant copying.

In digital broadcast, a TV program is broadcast as "copy one generation" content. Once the program is recorded by a reception apparatus or recording apparatus, it changes to "copy no more" content. Then, any processes such as backup, digest creation, and viewing on another apparatus, which were possible before, become difficult, resulting in inconvenience for viewers.

<Transfer>

"Transfer" is permitted even for "copy never" contents. However, if a high-quality content is converted into a low quality and transferred, the original high-quality content can be viewed no more.

For example, there are demands in no small numbers to view, on a cellular phone, contents received and recorded by a domestic TV set. However, digital broadcast data is transmitted assuming viewing on a domestic TV set and therefore has a relatively high resolution (e.g., 1920×1080 in a high resolution mode). Hence, the amount of recorded data is also large (about 10 Gbytes in 1-hr recording).

On the other hand, the screen resolution of a cellular phone is as low as about 240×180. The data recording capacity of the memory is also as small as about 1 Gbytes. Hence, high-resolution data cannot completely be transferred. Even if the data can be transferred, it cannot be displayed. Hence, the data must be transferred after reduction processing to a low resolution is done on the TV set side.

However, when high-resolution data is converted into low-resolution data and transferred, the original data is erased. For this reason, even when the data is transferred again from the cellular phone to the TV set, the data cannot be viewed at the original high resolution.

<Others>

Since the Internet and broadband become popular, a content recorded by a TV set may be transmitted to the Internet without erasing it from the recording apparatus of the reception apparatus in order to meet the requirement to view the content on a cellular phone. Content such as a TV program including transferring images uses a broadband. For this reason, if the band of a cellular phone is used, the image quality is poor, and the communication cost increases. Additionally, many persons concerned fear illicit outflow of contents through the Internet.

It is an object of the present invention to enable to view a content on a second apparatus while protecting the content.

In order to achieve the above object, according to the present invention, there is provided a reproduction control method characterized by comprising a conversion step of converting first program data accumulated in a first apparatus into second program data reproducible in a second apparatus, a transfer step of transferring the converted second program data to the second apparatus, and a reproduction disabling step of converting the first program data accumulated in the first apparatus into reconstructable reproduction-disabled data.

According to the present invention, there is also provided a content data reproduction control method characterized by comprising a conversion step of converting first content data accumulated in a first apparatus into second content data reproducible in a second apparatus, a transmission step of transmitting the converted second content data to the second apparatus, and a reproduction disabling step of setting the first content data accumulated in the first apparatus in a reproduction-disabled state that can be returned to an original reproduction-enabled state.

According to the present invention, there is also provided a reproduction apparatus characterized by comprising conversion means for converting first program data accumulated in the reproduction apparatus into second program data viewable in a second apparatus, transfer means for transferring the converted second program data to the second apparatus, and reproduction disabling means for converting the first program data accumulated in the reproduction apparatus into reconstructable reproduction-disabled data.

According to the present invention, there is also provided a television set characterized by comprising a reception unit which receives a program, a data accumulation unit which accumulates the received program as program data, and the reproduction apparatus.

Effects of the Invention

According to the present invention, viewing of content on the second apparatus can be enabled while protecting the content.

Further features of the present invention will become apparent from the following description of exemplary embodiments with reference to the attached drawings.

DESCRIPTION OF REFERENCE NUMERALS

Figure 1:
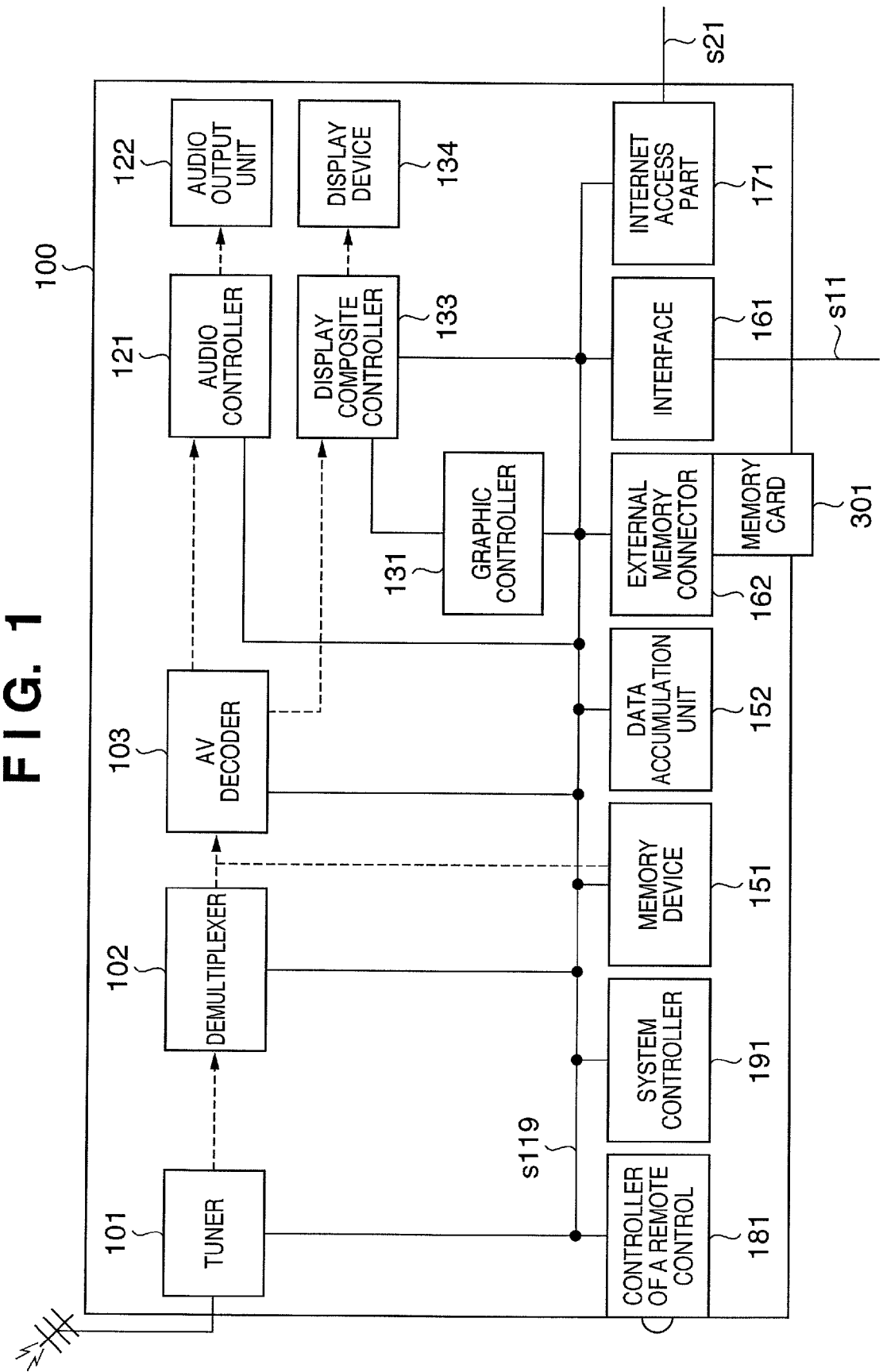
FIG. 1 is a block diagram of a TV set according to an embodiment.

100 TV set
101 Tuner
102 Demultiplexer
103 AV decoder
121 Audio controller
122 Audio output unit
131 Graphic controller
133 Display synthesis controller
134 Display device
151 Memory device
152 Data accumulation unit
161 Interface
162 External memory connector
171 Internet connector
181 Controller of a remote control
191 System controller
301 Memory card

BEST MODE FOR CARRYING OUT THE INVENTION

Preferred embodiments of the present invention will be described below in detail with reference to the accompanying drawings.

The embodiments to be described below are merely examples for practicing the present invention, and various changes and modifications should be made depending on various conditions and the arrangement of the apparatus to which the present invention is applied. The present invention is not limited to the following embodiments.

First Embodiment

The first embodiment will be described below by exemplifying a television set (TV set) 100 capable of receiving TV broadcast and a mobile terminal 200.

The TV set 100 capable of receiving broadcast will be described first with reference to FIG. 1.

FIG. 1 is a block diagram for explaining the TV set 100 according to the first embodiment. The TV set 100 includes a tuner 101, demultiplexer 102, AV decoder 103, audio controller 121, audio output unit 122, graphic controller 131, display synthesis controller 133, display device 134, memory device 151, data accumulation unit 152, interface 161, external memory connector 162, Internet connector 171, controller 181 of a remote control, and system controller 191.

The tuner 101 amplifies a high-frequency TV signal of received TV broadcast, selects a desired channel, and demodulates TS data (Transport Stream data) containing program data such as video data/audio data mixed with various kinds of data.

The demultiplexer 102 demultiplexes the TS data into program data such as video data/audio data, program information data, data broadcast data (data broadcast content, various kinds of metadata, control document, and other data broadcast data). The demultiplexer 102 outputs the program data such as video data/audio data to the AV decoder 103 and the program information data and data broadcast data to the memory device 151 through an internal bus s119.

The AV decoder 103 processes the video data and audio data. The AV decoder 103 decodes the demultiplexed audio data and outputs it to the audio controller 121. The AV decoder 103 also decodes the video data encoded by, e.g., MPEG and outputs it to the display synthesis controller 133. The AV decoder 103 can decode video data with a resolution of 1920×1080 and a frame rate of 60 Hz at maximum.

The audio controller 121 switches or synthesizes audio data from the AV decoder 103 and internal bus s119, controls the sound volume, sound quality, and ambience, and outputs the data to the audio output unit 122 as an audio signal.

The audio output unit 122 amplifies the received audio signal and outputs sound from the speaker.

The graphic controller 131 generates a data broadcast window, an application window in the TV set 100, and a GUI window for messages under the control of the system controller 191 to be described later.

On the basis of a control signal from the system controller 191, the display synthesis controller 133 executes switching, synthesis, enlargement/reduction, various kinds of conversion, and correction for the program data from the AV decoder 103 and the image data generated by the graphic controller 131 and outputs the data to the display device 134.

The display synthesis controller 133 has two planes, i.e., a data broadcast plane and an application plane which can be rendered and controlled independently. The data broadcast plane has a plurality of planes including a moving image plane, still image plane, and text/graphic plane which can also be controlled independently.

The display device 134 displays image data from the display synthesis controller 133. The display device 134 includes, e.g., a 50-inch large screen display capable of displaying a high-quality image at a resolution of 1920×1080 and a frame rate of 60 Hz.

The memory device 151 saves the data broadcast content, program information data, control document, and other data broadcast data demultiplexed by the demultiplexer 102. The memory device 151 is also used as a work memory by the system controller 191 to execute a program.

The data accumulation unit 152 is a so-called HDD. The data accumulation unit 152 accumulates, reproduces, and deletes various kinds of data (the received video data/audio data and other contents) in accordance with the received control document or an instruction from the viewer or system controller 191 (to be described later). The HDD has a much larger capacity (several hundred Gbytes or more) than the above-described memory device 151 and can accumulate a plurality of received high-quality program data for each program.

The data accumulation unit 152 also accumulates the received program information, meta data, control document, other data broadcast data, charge control data, and viewer's viewing log data to be used by the system controller 191 for various kinds of control such as reception, accumulation, and reproduction, and saves and deletes the data as needed. Control data such as an accumulation control table (to be described later) is also saved. The area to be used by the system controller 191 is managed separately from video data/audio data.

The interface 161 connects the mobile terminal 200 (to be described later) and executes transmission/reception control of various kinds of data.

The external memory connector 162 is used to connect an external nonvolatile memory card 301.

The memory card 301 is an external nonvolatile memory card. The memory card 301 is used to copy, transfer, and exchange data or a content of another device such as the mobile terminal 200 (to be described later) or digital camera and is also used as an auxiliary accumulation unit of the TV set 100. Program data such as video data/audio data of the TV set 100 is transferred to the memory card 301 and viewed on another device. Hence, the memory card 301 is also used as a removable external medium.

The Internet connector 171 is used to connect the Internet or a broadcast station server or charging server through a router (not shown) to reserve a reception apparatus or transmit/receive various kinds of data such as accumulation information or charge information of pay contents.

The Internet connector 171 also connects the mobile terminal 200 through the Internet to execute two-way data transmission/reception and control.

The controller 181 of a remote control is a remote transmission/reception controller using infrared rays. The controller 181 of a remote control transmits/receives data to/from a remote controller operated by a TV viewer to transfer the data to the system controller 191.

The system controller 191 systematically controls the internal components of the TV set 100. The system controller 191 includes a CPU, main memory, bus controller, program storage unit, parameter saving unit, ID saving unit, timepiece, and timer (none are shown).

The system controller 191 controls the above-described tuner 101 and demultiplexer 102 in receiving TV broadcast.

The system controller 191 controls channel switching in the tuner 101 in accordance with a channel selection signal transmitted from a remote controller and controls demodulation of TS data (to be described later) to receive a desired airwave. The system controller 191 causes the demultiplexer 102 to demultiplex program data such as video data/audio data, program information data, and data broadcast data from the TS data.

The system controller 191 causes the demultiplexer 102 to output the program data to the AV decoder 103 and store the program information data and data broadcast data in the memory device 151 and data accumulation unit 152 through the internal bus s119.

The system controller 191 executes access control including charge control by analyzing the stored program information data and data broadcast data. The system controller 191 also constructs the program table of normal broadcast or server type broadcast by extracting the program information.

The system controller 191 controls reservation, reception, accumulation, reproduction, and charge of a broadcast content such as video data and audio data in accordance with a user instruction by a remote controller and an instruction of the above-described control document and causes the data accumulation unit 152 to accumulate the received program data such as video data and audio data.

The system controller 191 controls the graphic controller 131 to display video data and data broadcast data, an application in the TV set 100, messages, and operation panel.

The system controller 191 recognizes the mobile terminal 200 connected to the interface 161, converts part of the accumulated video data and copies or transfers the data to the mobile terminal 200, and copies or transfers the accumulated audio data to the mobile terminal 200 without conversion on the basis of a request from the viewer. At this time, the system controller 191 encrypts the data to be copied or transferred to the mobile terminal 200 as needed.

The system controller 191 controls the display synthesis controller 133 to synthesize video data from the AV decoder 103 with the image data from the graphic controller 131. The display synthesis controller 133 controls various kinds of information display such as correction and causes the display device 134 to display various kinds of information.

Similarly, the system controller 191 controls the audio controller 121 to control sound synthesis and output to the audio output unit 122.

The system controller 191 also controls transmission/reception of various kinds of data to/from the remote controller operated by the viewer and controls the internal components of the TV set 100 on the basis of the data.

The internal bus s119 includes a data bus and a control bus. As described above, the internal bus s119 is used to transfer image data and audio data and transfer of information from each unit.

Figure 2:
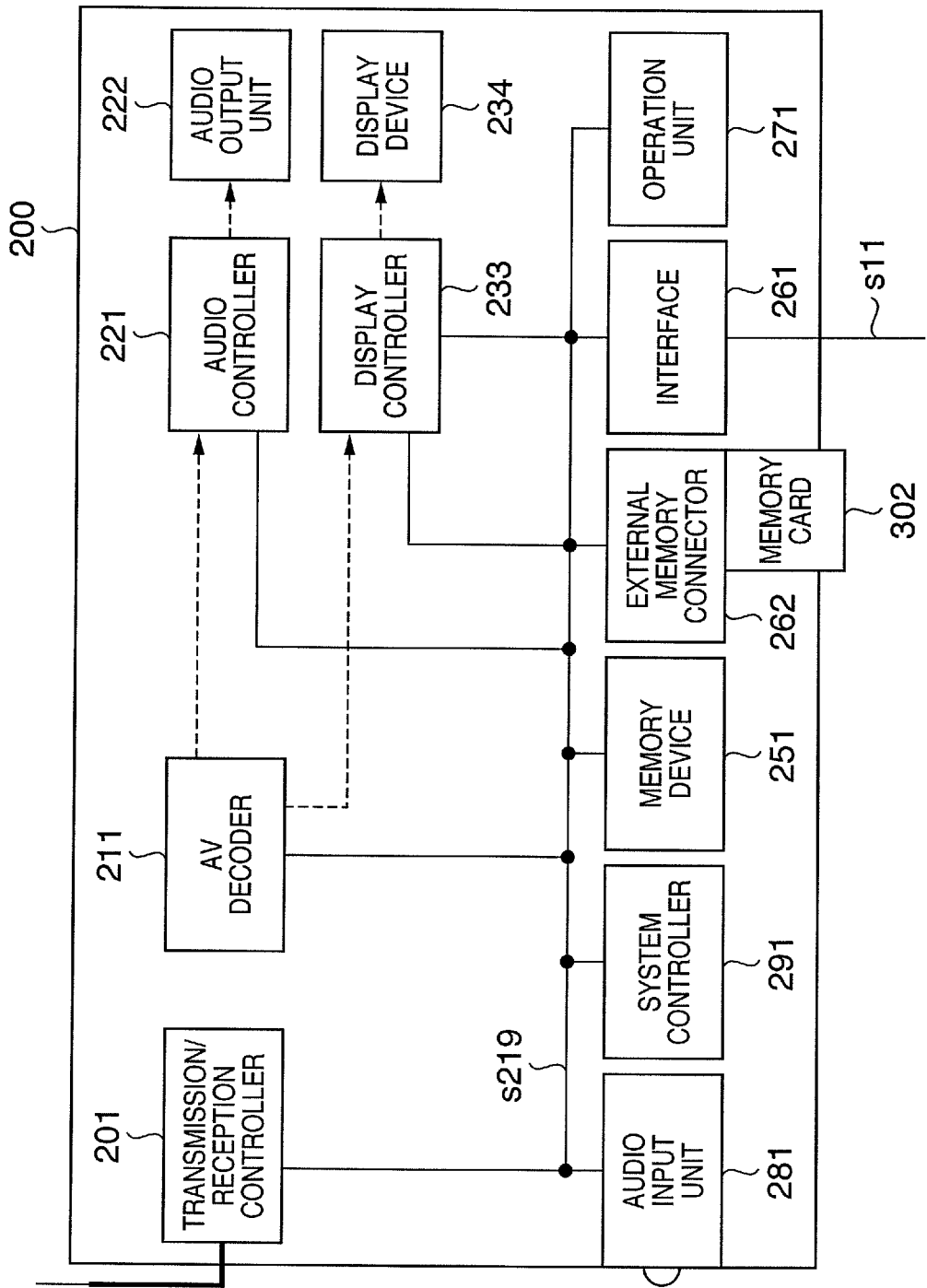
FIG. 2 is a block diagram of a mobile terminal apparatus according to the embodiment.

The mobile terminal 200 used in this embodiment for mobile viewing will be described next with reference to FIG. 2. The mobile terminal 200 includes a transmission/reception controller 201, AV decoder 211, audio controller 221, audio output unit 222, display controller 233, display device 234, memory device 251, interface 261, external memory connector 262, operation unit 271, audio input unit 281, and system controller 291.

The mobile terminal 200 is a cellular phone with a removable memory card. The image quality of display of the mobile terminal 200 is lower than the image quality of the above-described TV set 100 (corresponding to the "first image quality" of the present invention), as will be described later.

The transmission/reception controller 201 implements speech communication with a partner by executing wireless two-way communication with a telephone office. The mobile terminal 200 also connects to the Internet by using the transmission/reception controller 201 and transmits/receives various kinds of data to/from the server. The mobile terminal 200 also connects to the TV set 100, as described above, by using the transmission/reception controller 201 and transmits/receives and controls various kinds of data. The transmitted data is saved in the memory device 251 or an external memory card 302 through an internal bus s219, as needed.

The AV decoder 211 decodes video data and audio data received from the transmission/reception controller 201 or encoded by, e.g., MPEG and accumulated in the memory device 251 or external memory card 302 and outputs the data to the audio controller 221 and display controller 233.

The AV decoder 211 can decode video data with a resolution of 320×240 and a frame rate of 30 Hz in accordance with the performance of the transmission/reception controller 201, the capacity of the memory device 251, and the display performance of the display device 234 (to be described later).

The audio controller 221 switches or synthesizes audio data from the above-described AV decoder 211 and internal bus s219, controls the sound volume, sound quality, and ambience, and outputs the data to the audio output unit 122 (to be described later) as an audio signal.

The audio output unit 222 amplifies the audio signal received from the audio controller 221 and outputs sound from the speaker.

The display controller 233 converts the resolution or frame rate of the video data decoded by the AV decoder 211 in accordance with the display performance of the display device 234. On the basis of control data from the system controller 291, the display controller 233 executes switching, synthesis, various kinds of conversion, and correction to display the window of various kinds of applications running on the mobile terminal 200 and a GUI window for messages and menus. The display controller 233 outputs data to display a window to the display device 234.

The display device 234 displays a window on the basis of data output from the display controller 233. The display device 234 has a capability (display performance) of a resolution of 240×180, a frame rate of 20 Hz, and a size of 2.4 inches. The display device 234 can display only a low-quality image as compared to the TV set 100. The display device 234 can display a content within this display range.

The memory device 251 accumulates, reproduces, and deletes the received video data and audio data and other contents in accordance with an instruction from the system controller 291 (to be described later).

The memory device 251 has the functions of both the memory device 151 and data accumulation unit 152 of the TV set 100. However, since the capacity of the memory device 251 is small (several ten bytes to several Gbytes), it is difficult to directly accumulate high-resolution program data received by the TV set 100.

The interface 261 is connected to the TV set 100 to transmit/receive and control various kinds of data.

The external memory connector 262 connects the external nonvolatile memory card 302.

The memory card 302 is an external nonvolatile memory card. The memory card 302 is compatible with the memory card 301 used in the TV set 100. The memory card 302 can be used as the memory card 301 of the TV set 100.

The operation unit 271 includes a keyboard and touch operation panel. The operation unit 271 serves as an input part to be used by the user to operate the mobile terminal 200.

The audio input unit 281 is used by the user for speech communication using the mobile terminal 200.

The system controller 291 systematically controls the mobile terminal 200. For example, the system controller 291 controls connection to the telephone office, speech communication, and data transmission/reception. The system controller 291 also controls, via the telephone office, connection to the Internet, data transmission/reception, and a content such as program data obtained from the transmission/reception controller 201, interface 261, or memory card 302 and executes display and audio output.

The system controller 291 is also connected to the TV set 100 through the interface 261 to control transmission/reception of program data in the TV set 100.

Figure 3:
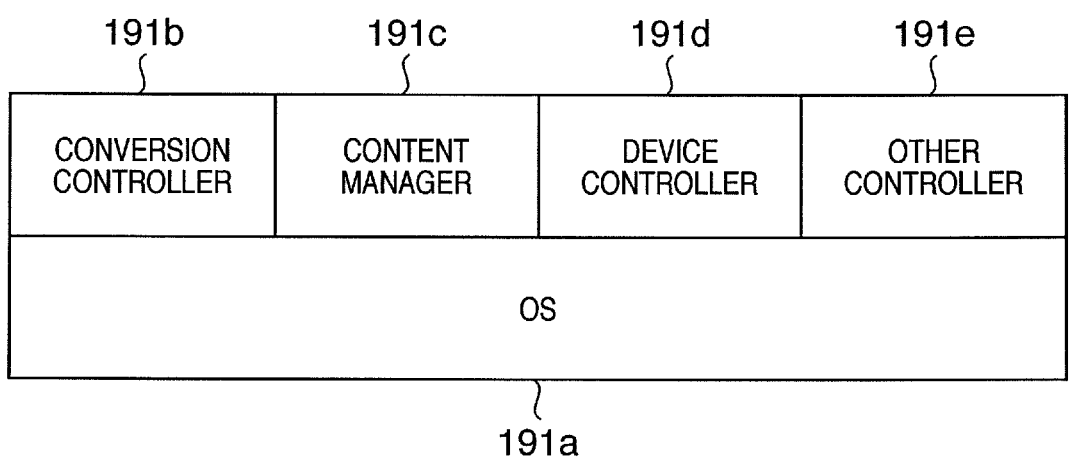
FIG. 3 is a view of the control arrangement of the TV set according to the embodiment.

FIG. 3 is a view showing the configuration of control units in the system controller 191 of the TV set 100.

A basic system controller 191a includes an OS. A conversion controller 191b, content manager 191c, device controller 191d, and other controller 191e operate under the management of the basic system controller 191a.

Reference numeral 191b denotes the conversion controller. The conversion controller 191b executes data processing (demultiplex, synthesis, encryption, resolution conversion, and frame rate conversion) of accumulated video data and audio data in accordance with a request from another controller.

Reference numeral 191c denotes the content manager. The content manager 191c controls accumulation management of accumulated video data and audio data, copy to another device, saving of data converted by the conversion controller 191b, and transmission/reception to/from another device.

Reference numeral 191d denotes the device controller. The device controller 191d detects an external device connected to the interface 161, external memory connector 162, or Internet connector 171 and executes authentication processing to determine whether the device can be authenticated in the TV set 100. If the device is authenticated, data transmission/reception is permitted.

When transfer or copy of some program data is requested of the device for which data transmission/reception is permitted, the device controller 191d controls data transmission/reception in synchronism with the content manager 191c.

Reference numeral 191e denotes the other controller. The other controller 191e includes other control functions to control TV broadcast reception and display, audio output, and remote control necessary for the operation of the TV set 100. For example, the other controller 191e includes a so-called bml (Broadcast Markup Language) browser function that operates in accordance with a control document described as a bml document. The bml browser function controls display, accumulation, reproduction, and access of received data broadcast data in accordance with the above-described various kinds of control documents. The bml is a page description language which is oriented to data broadcast and based on XML (eXtensible Markup Language) as one of markup languages to describe the significance and structure of a document and data.

The mobile terminal 200 has the same control arrangement as that of the TV set 100. The control arrangement of the mobile terminal 200 also controls the respective functions of the mobile terminal 200, as described above.

The mobile terminal 200 of this embodiment receives no digital broadcast and therefore has no bml browser function. Instead, the mobile terminal 200 incorporates an HTML browser to browse and control various kinds of contents of the Internet.

Broadcast data broadcast in this embodiment will be described next.

Figure 4:
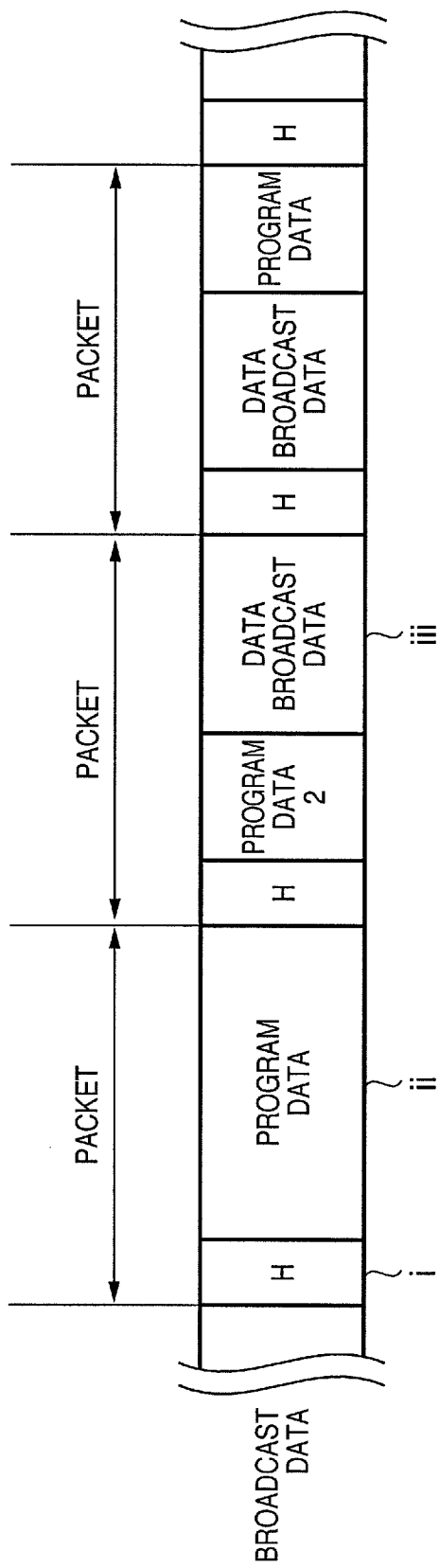
FIG. 4 is a view of the structure of broadcast data according to the embodiment.

FIG. 4 is a view for explaining the details of broadcast data, i.e., so-called TS data transmitted from a broadcast station.

Broadcast data according to this embodiment contains (i) header field, (ii) program data field, and (iii) data broadcast data field.

(i) The header field includes program related information called SI information (service information) and other control information. The title, genre, performer information, and details of a content are described in the SI information.

(ii) The program data is a program portion that is transmitted as so-called video data/audio data, i.e., program data to be viewed by the viewer. The program data has a structure based on the so-called MPEG standard.

(iii) The data broadcast data contains a data broadcast content and various kinds of control documents.

The control documents include various kinds of control documents for data broadcast display/control, program reproduction, access control, and charge control. Each control document is described as a bml document described by a content description language bml.

Conversion of video data and audio data will be described next.

As described above, the video data used in this embodiment is encoded on the basis of the MPEG standard.

In MPEG encoding, each frame of a moving image is segmented into blocks each including 8×8 pixels or 8×16 pixels, and the blocks are subjected to DCT.

In this case, the data is divided into a DC component and an AC component. The DC component corresponds to the average value in the block.

On the other hand, a frame (intrapicture; to be referred to as an "I picture (Intra-Picture)" hereinafter) serving as the base of other picture decoding, and a P picture (Predictive Picture) and B picture (Bidirectionally predictive-Picture) decoded from the I picture by using a motion vector are decided for a plurality of frames called a GOP (Group Of Pictures).

A GOP is formed from a group of several to several ten frames. One I picture is present in each group.

These pictures are converted by DCT and then encoded. Only the DC component of the I picture is encoded separately from the remaining pictures and the AC component of the I picture. Hence, the DC component can be separated from the other data upon reception.

In this embodiment, MPEG-encoded and recorded video data to be viewed on the mobile terminal 200 is converted in accordance with the display performance such as the resolution and frame rate of the mobile terminal 200.

Video data for the mobile terminal 200 is generated by using the DC component of the I picture of the original video data.

In this embodiment, this is done by the following technique.

In this embodiment, before program data is transmitted from the TV set 100 to the mobile terminal 200, the device data (e.g., decoder performance and display performance including the decodable scheme, resolution, and frame rate) of the mobile terminal 200 is sent from the mobile terminal 200 to the TV set 100.

Upon receiving the device data, the device controller 191d of the TV set 100 sends the display performance (device data) of the mobile terminal to the content manager 191c and controls the conversion controller 191b to generate and encode video data corresponding to the display performance as much as possible within the decoder performance. The video data is transmitted to the mobile terminal 200 through the device controller 191d.

First, the TV set 100 decodes the original program data, i.e., MPEG data, executes thinning and time-corrected frame generation, and re-encodes the data by MPEG in accordance with the display performance.

In this embodiment, the frame of the I picture time of the original MPEG data is always in this processing.

When the data is re-encoded by MPEG, the DC component of the MPEG data of the original program can be used directly.

The program data containing the DC component of the I picture of the MPEG data of the original program and the additional encoded data is transmitted to the mobile terminal 200. In the mobile terminal 200, the program data is decoded by the AV decoder 211 and corrected and displayed by the display controller 233 in accordance with the display performance.

Depending on circumstances of conversion, all the DC components are not always used in decoding the program data on the side of the mobile terminal 200.

More specifically, the image of the original program in the TV set 100 of this embodiment has a resolution of 1920×1080 and a frame rate of 60 Hz. The mobile terminal 200 has decoder performance of a resolution of 320×240, a frame rate of 60 Hz, and MPEG decoding and display performance of a resolution of 240×180 and a frame rate of 20 Hz.

In consideration of the aspect ratio (16:9) of the image of the original program, the TV set 100 converts the video data such that it is displayed on the mobile terminal 200 in a size corresponding to a resolution of 240×135.

In this case, the desired resolution can be obtained by using only the DC component of the MPEG-encoded data of the original program. Hence, only the DC component without additional data may be transmitted as image data.

If only the I picture is used, the frame rate may be short. Hence, if the time interval becomes long, a P picture or B picture with a resolution of 240×135, which can be decoded on the basis of the DC component, is generated and encoded (additional encoded data is generated). Time correction is done by the display controller 233 of the mobile terminal 200 upon receiving the data.

When part of the original MPEG data (copy-limited program data) is separated and transmitted in the above-described way, low-quality program data can be viewed on the mobile terminal 200.

Audio data can be directly decoded and heard even on the mobile terminal 200, unlike video data. In addition, since the amount of audio data is smaller than video data, neither re-encoding nor conversion need be executed in the TV set 100 to generate audio data for the mobile terminal 200.

<Explanation of Operation of this Embodiment>

Figure 5:
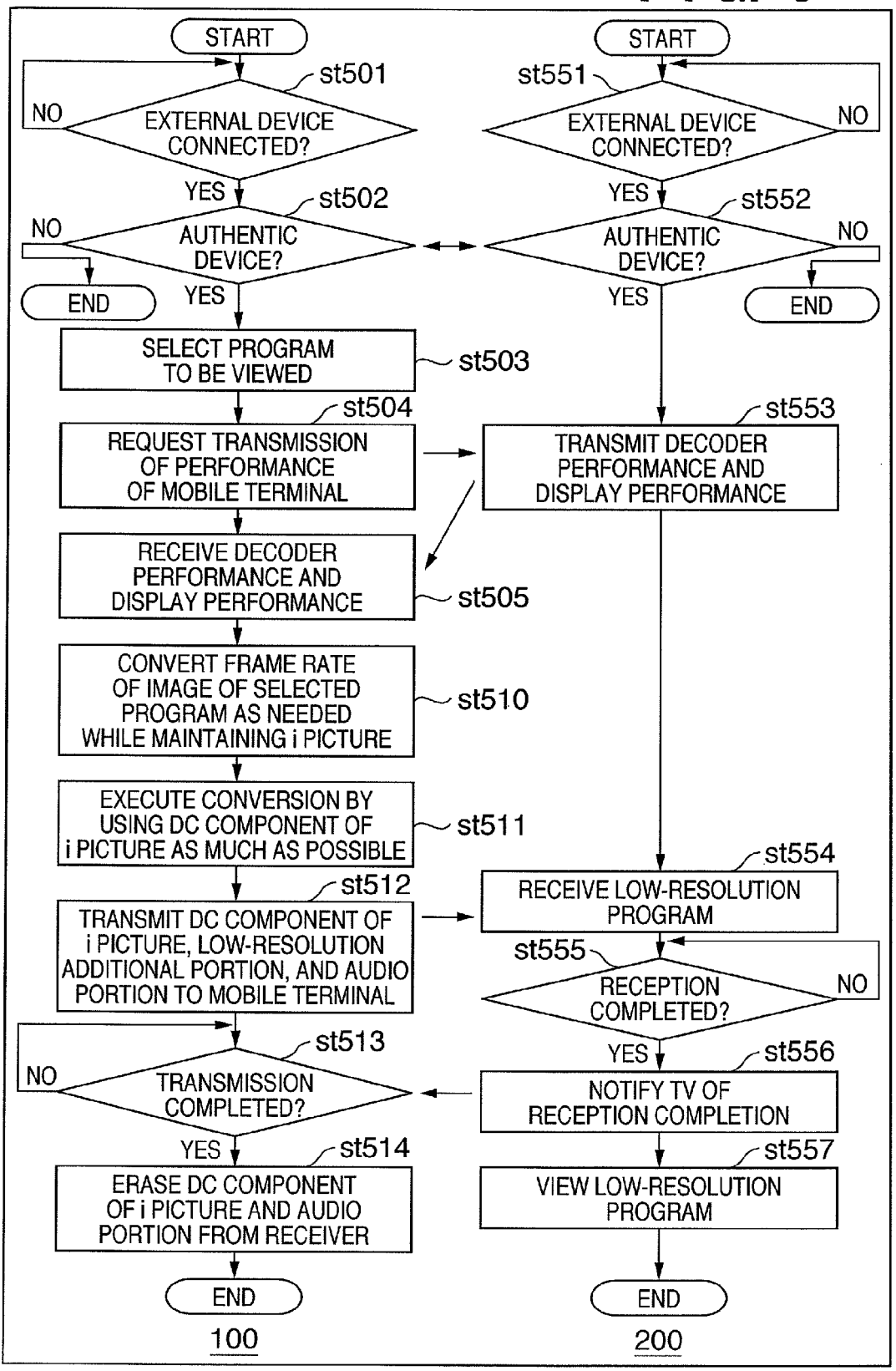
FIG. 5 is a flowchart for explaining the transfer operation of program data from the TV set 100 according to the embodiment.
Figure 6:
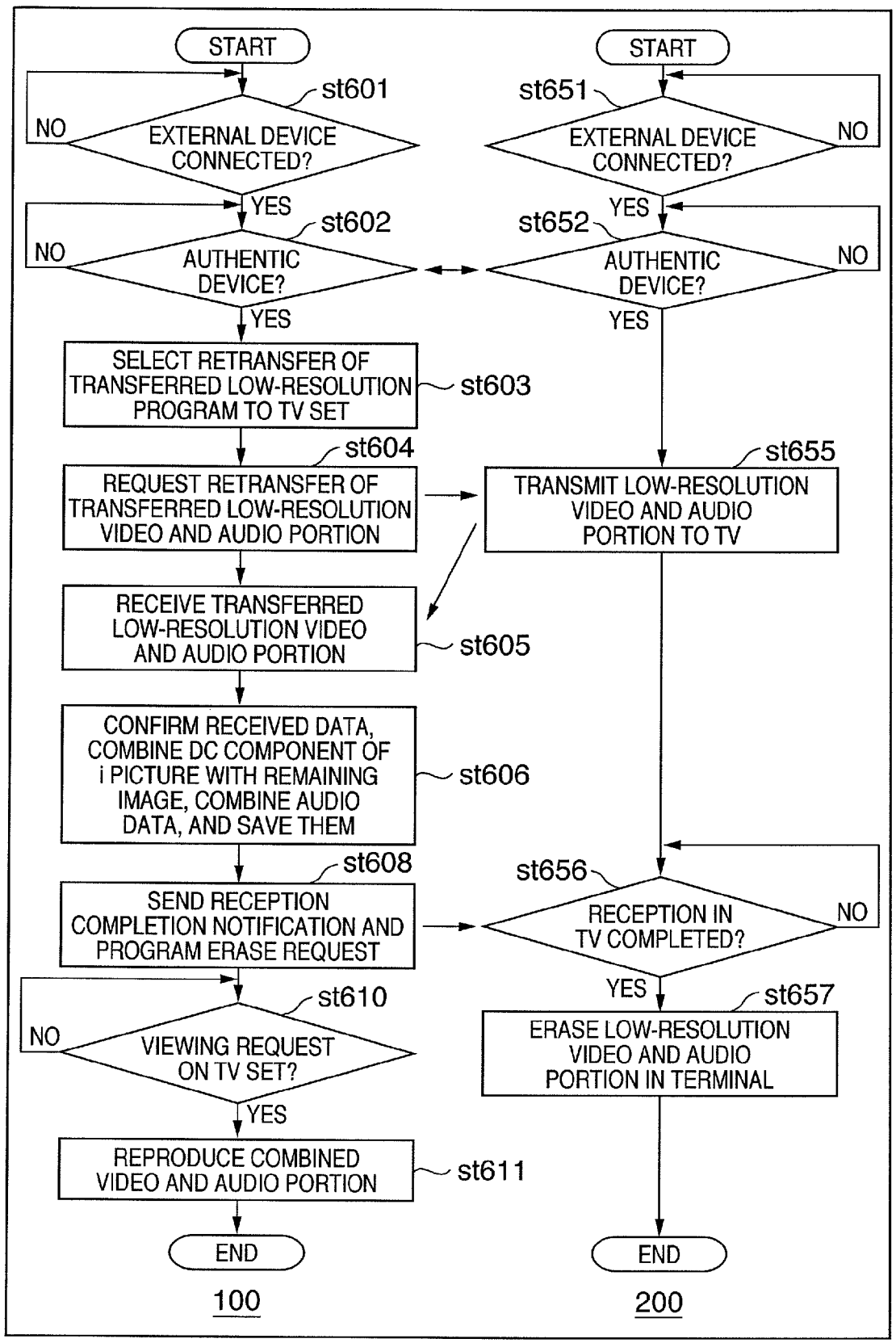
FIG. 6 is a flowchart for explaining the retransfer operation of program data from a mobile terminal 200 according to the embodiment.

The operation of this embodiment will be described next with reference to FIGS. 5 and 6. Both FIGS. 5 and 6 illustrate a flowchart showing the operation of the TV set 100 on the left side and a flowchart showing the operation of the mobile terminal 200 on the right side.

A description will be made below assuming that program data are accumulated in the data accumulation unit 152 of the TV set 100 by the viewer's operation, and the TV set 100 and mobile terminal 200 can authenticate each other.

<Program Data Transfer from TV Set 100>

A case wherein program data with a low resolution is transferred from the TV set 100 to the mobile terminal 200, and low-quality program data is viewed on the mobile terminal 200 will be described first with reference to FIG. 5.

The mobile terminal 200 is connected to the TV set 100 by a connection cable s11.

Both the device controller 191d of the TV set 100 and the system controller 291 of the mobile terminal 200 detect connection of an external device (st501 and st551) and execute authentication processing (st502 and st552).

If authentication has failed, subsequent processing cannot be done. Both the TV set 100 and the mobile terminal 200 end the processing (st502 and St552). At this time, the TV set 100 or mobile terminal 200 notifies the viewer that authentication has failed.

If authentication is successful, the viewer of the TV set 100 operates the GUI (Graphical User Interface) displayed on the screen of the TV set 100 by operating the remote controller of the TV set 100 to select and decide a program to be viewed on the mobile terminal 200 (st503). When the program is decided, the TV set 100 requests the mobile terminal 200 to transmit device data containing display performance (st504). Assume that the selected program has a resolution of 1920× 1080 and a frame rate of 60 Hz.

In response to the device data request, the mobile terminal 200 transmits device data containing decoder performance and display performance to the TV set 100. In this embodiment, the mobile terminal 200 has decoder performance for MPEG decoding, a maximum resolution of 320×240, and a frame rate of 30 Hz and display performance of a resolution of 240×180 and a frame rate of 20 Hz, as described above. The mobile terminal 200 transmits the device data to the TV set 100 (st553).

The TV set 100 receives the device data containing decoder performance and display performance (st504). The frame rate and resolution of the video data of the selected program are converted into a resolution of 240×135 and a frame rate of about 20 Hz in accordance with the decoder performance and display performance of the mobile terminal 200 while maintaining the DC component of the I picture as much as possible (st510 and st511). The TV set 100 generates the video data and audio data after conversion as program data for the mobile terminal.

The TV set 100 transmits the program data with a low resolution (data converted by using the DC component of the I picture of the original program data, additional encoded data, and audio data) to the mobile terminal 200 (st512).

The mobile terminal 200 receives the program data with the low resolution and saves it in the memory device 251 or memory card 302 (st554). When saving of the program data is completed, the mobile terminal 200 transmits a reception completion notification to the TV set 100 (st555 and st556).

Upon receiving the reception completion notification (st513), the TV set 100 separates and erases the DC component of the I picture from the video data and erases all audio data related to the selected program from the data accumulation unit 152 (st514). After reception of the reception completion notification, the program data for the mobile terminal 200 can be generated again from the original program data even if program data transfer to the mobile terminal 200 has failed because only part of the program data of the selected program is erased.

In the mobile terminal 200 in which the video data with the low resolution and audio data are accumulated on the basis of the viewer's operation, the AV decoder 211 decodes the video data and audio data, as described above. The display controller 233 corrects the frame rate as needed and displays the data on the display device 234 with a resolution of 240×180 at a resolution of 240×135 and a frame rate of 20 Hz (st557). Hence, the viewer can view the selected program data on the mobile terminal 200.

On the other hand, only the difference data obtained by removing the DC component of the I picture of the original program data (copy-limited program data) remains in the TV set 100. Hence, the data cannot normally be decoded. The audio data is completely transferred to the mobile terminal 200 and cannot therefore be reproduced. Even when the video data of the original program data remains, normal viewing is impossible because the audio data is transferred.

<Program Data Retransfer from Mobile Terminal 200>

A case wherein program data with a low resolution which is transferred to the mobile terminal 200 is retransferred to the TV set 100, and high-quality program data is viewed on the TV set 100 will be described next with reference to FIG. 6.

Processing after the mobile terminal 200 and TV set 100 are connected, and authentication is done in both devices is the same as in FIG. 5 described above (st601, st602, st651, and st652).

The viewer operates the remote controller of the TV set 100 to select program data with a low resolution to be transferred and decide retransfer to the TV set 100 (st603). Program data saved in the mobile terminal 200 may be selected by the remote controller of the TV set 100. This arrangement can be implemented by causing the TV set 100 to acquire the list of program data saved in the memory device 251 or memory card 302 of the mobile terminal 200 at the time of connection or authentication. Alternatively, the list of program data transferred to the authenticated mobile terminal 200 may be saved in the TV set 100 so that the list of transferred program data may be selected on the screen of the TV set 100 after authentication.

The mobile terminal 200 is requested to retransfer, of (1) data obtained by separating the DC component of the I picture of the original program data, (2) additional encoded data, and (3) audio data, which are received and accumulated in the memory device 251 or memory card 302 as the selected program data with the low resolution, (1) data obtained by separating the DC component of the I picture of the original program data and (3) audio data (st604).

Upon receiving the retransfer request, the mobile terminal 200 transmits, to the TV set 100, the two kinds of data, i.e., the data obtained by separating the DC component of the I picture of the original program data and the audio data (st655).

Upon receiving the data, the device controller 191d of the TV set 100 recognizes the two kinds of data and asks the content manager 191c to receive and manage the data.

The content manager 191c recognizes that the received data contains the program with a low resolution and audio data which were transmitted before, combines the data with the difference data remaining in the data accumulation unit, and saves the data (st605 and st606).

The content manager 191c transmits a reception completion notification and a low-resolution program erase request to the mobile terminal 200 through the device controller 191d (st608). Upon receiving the delete request, the mobile terminal 200 erases the program data with the low resolution accumulated in the memory device 251 or external memory card 302 (st656 and st657).

Then, all program data of the program are received in the TV set 100 so that a high-resolution program in a viewable state is reconstructed (st610 and st611).

A case wherein after viewing of the program data with a low resolution on the mobile terminal 200 is ended, program data with a high resolution need not be viewed on the TV set 100 and should be erased will be described next, although not illustrated.

The viewer executes an operation of erasing program data through the operation unit of the mobile terminal 200. In this case, the mobile terminal 200 erases the program data with a low resolution in the memory card 302 in the mobile terminal 200. At the same time, the system controller 291 controls the transmission/reception controller 201 to transmit, to the TV set 100 through the Internet, erase information to notify that the program data has been erased.

Upon receiving the erase information through the Internet connector 171, the device controller 191d of the TV set 100 recognizes the mobile terminal 200 and the erase information and asks the content manager 191c to erase the program. The content manager 191c erases saved difference data with a high resolution. With this processing, the TV set 100 can be prevented from wastefully accumulating data.

According to the arrangement of this embodiment, program data with a low resolution can easily be viewed on the mobile terminal 200 incapable of viewing program data with a high resolution. If program data with a low resolution can be viewed on the mobile terminal 200, viewing of program data with a high resolution can be disabled on the TV set 100. When the program data with a low resolution is retransferred from the mobile terminal 200, the original program with a high resolution can be viewed on the TV set 100.

Second Embodiment

In the first embodiment, after video data with a low resolution is transferred to the mobile terminal 200 by using a technique of transmitting part of a DCT block of MPEG video data, viewing of the program data on the TV set 100 is disabled.

In the second embodiment, however, after program data is transferred to a mobile terminal 200, viewing of program data with a low resolution is enabled on both a TV set 100 and the mobile terminal 200 by the following method.

The method and operation will be described below with reference to FIGS. 7 and 8.

<Viewing of Video Data with Low Resolution>

Figure 7:
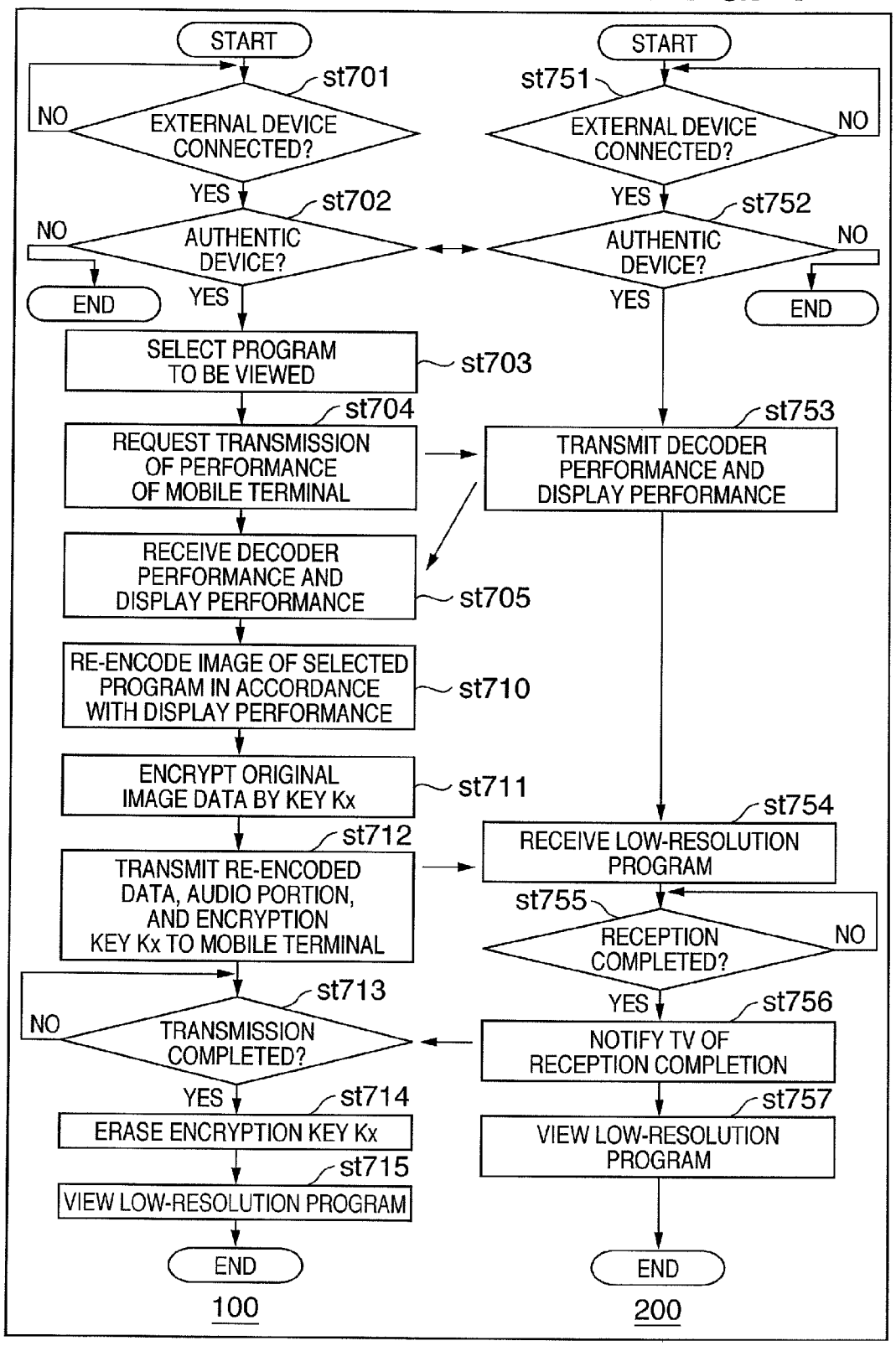
FIG. 7 is a flowchart showing an operation of enabling to view low-resolution program data on the TV set 100 and mobile terminal 200 according to the embodiment.
Figure 8:
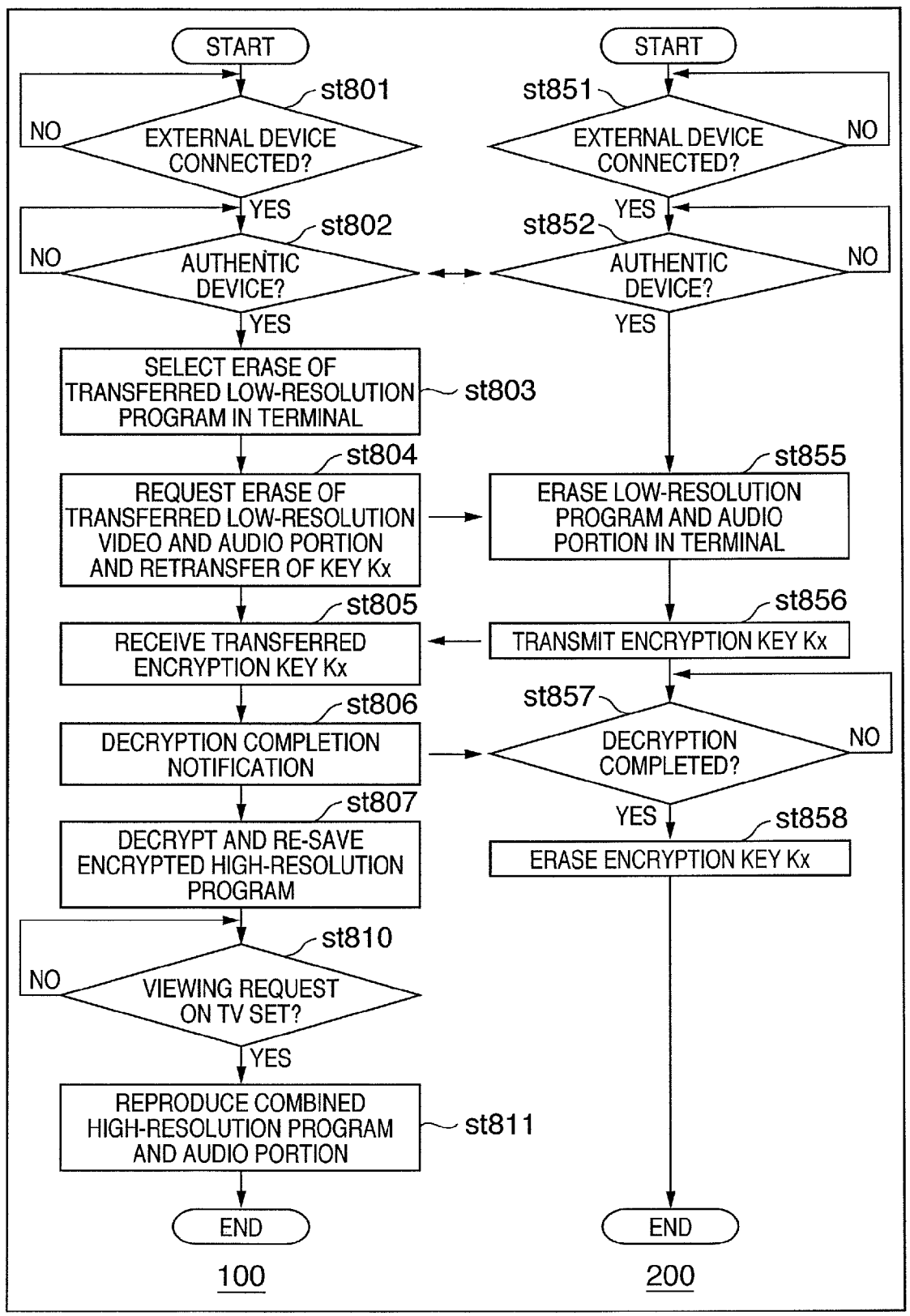
FIG. 8 is a flowchart showing an operation of enabling to view low-resolution program data according to the embodiment.

FIG. 7 is a flowchart showing an operation of transferring video data with a low resolution to the mobile terminal 200 and enabling to view the data on both the mobile terminal 200 and the TV set 100.

Steps st701 to st705 and st751 to st753 of the second embodiment are the same as steps st501 to st505 and st551 to st553 of the first embodiment, and a description thereof will be omitted.

A content manager 191c of the TV set 100 controls a conversion controller 191b to rasterize video data with a resolution of 1920×1080 and re-encode the data to the resolution (240×135) and frame rate (20 Hz) of the mobile terminal 200 to generate program data with a low resolution (st710). That is, a system controller 291 converts the content data of a content accumulated in an HDD serving as a data accumulation unit 152 into low-bit-rate data.

After conversion to the program data with a low resolution, the original program data with a high resolution is encrypted by using an encryption key Kx (st711).

The re-encoded low-quality program data (video data with a low resolution and audio data) is transmitted to the mobile terminal 200 together with the encryption key Kx (st712). On the other hand, the TV set 100 saves, in a memory device 151, the same data as the low-quality program data transmitted to the mobile terminal 200.

Upon receiving the program data, the mobile terminal 200 accumulates the low-quality program data and encryption key Kx in a memory device 251.

When reception is ended, the mobile terminal 200 transmits a reception completion notification to the TV set 100 (st754, st755, and st756).

Upon receiving the reception completion notification (st713), the TV set 100 erases the encryption key Kx (st714).

With this operation, the received and accumulated program data with a low resolution can be decoded and viewed on the mobile terminal 200.

The original program data with a high resolution is encrypted and remains in the TV set 100. The encryption key Kx is erased and therefore is not present in the TV set 100. Hence, the program data with a high resolution cannot be viewed on the TV set 100. However, since the re-encoded program data with a low resolution, that is low-bit-rate and audio data for the mobile terminal 200 are saved, the program data with a low resolution can be viewed (st711).

<Viewing of High-Quality Program Data>

Viewing of high-quality program data on the TV set 100 will be described next with reference to FIG. 8.

The operation procedures of connection and device authentication of the TV set 100 and mobile terminal 200 are the same as described above (st801, st802, st851, and st852).

When a high-resolution program data viewing request is transmitted by the viewer in the TV set 100 (st803), the content manager 191d, the mobile terminal 200 to erase program data with a low resolution and transmit the encryption key Kx of the program data with a high resolution (st804).

Upon receiving the request, the mobile terminal 200 erases the video data with a low resolution and audio data in the mobile terminal 200 (st855) and transmits the encryption key Kx to the TV set 100 (st856).

Upon receiving the encryption key Kx, the TV set 100 transmits a reception completion notification to the mobile terminal 200 (st806). Upon receiving the notification (st857), the mobile terminal 200 erases the encryption key Kx from the system controller 291 (st858).

In the TV set 100, the content manager 191c controls the conversion controller 191b to decode (decrypt) the program data with a high resolution which is encrypted by using the encryption key Kx and save the data in the data accumulation unit 152 again (st807).

When a program-viewing request is received from the viewer (st810), a high-quality program can be reproduced again (st811).

Third Embodiment

As the third embodiment, viewing of a program on a TV set 100 can be disabled by transmitting video data with a low resolution and audio data to a mobile terminal 200 and then erasing the program data with a low resolution from the TV set 100 in the above-described second embodiment, as in the first embodiment.

Other Embodiment

In the first and second embodiments, authentication of an external device and program data transmission are done by directly connecting the TV set 100 to the mobile terminal 200 by a cable. Instead, the connectors of the devices may directly be connected.

Alternatively, wireless interfaces or Internet connection via the Internet connector of the TV set 100 and the transmission/reception unit of the mobile terminal may be used.

Especially in the second embodiment, when program data with a low resolution is transferred to the mobile terminal 200, and then, program data with a high resolution is to be viewed on the TV set 100, only the encryption key Kx to decrypt the program data with a high resolution needs to be transmitted by retransfer from the mobile terminal 200. Hence, this method is practical.

Alternatively, video data or audio data may be accumulated in the memory cards 301 and 302 connected to external memory connectors prepared on both devices so that the memory cards can be used as a medium.

In this case, the memory card can freely be removed from the external memory connector, and the write can freely be done. A medium such as a CD or DVD and the external memory connector 162 may be a medium write/read device.

The arrangement described in association with the TV set 100 of this embodiment can also be applied to a reception apparatus, recording apparatus, and image control apparatus without any display device.

The arrangement of the mobile terminal 200 for mobile viewing can be applied not only to a cellular phone but also to any other storage device and recording apparatus such as a PDA and notebook computer.

The program data compression scheme is not limited to MPEG, and any other scheme capable of conversion and decoding in the TV set 100 and mobile terminal 200 can be used.

As described in the above embodiments, a viewing scheme that enables to view a high-quality content in the transfer source can be provided by wholly or partially leaving a high-quality copy-protected content in the transfer source in a viewing disabled state, transferring a degraded low-quality content to the transfer destination, permitting viewing of the content at the transfer destination, and retransferring, to the transfer source, the degraded content transferred to the transfer destination.

In addition, a viewing scheme that enables to view a high-quality content in the copy source can be provided by permitting to view a high-quality copy-protected content at least at the copy destination with a degradation in image quality and erasing the degraded copied content at the copy destination.

A copy-limited reproduction method can be implemented in which a low-quality content can be reproduced at two locations, and a high-quality content can be reproduced in the transfer source by erasing a low-quality content at the transfer destination. Hence, convenient viewing is possible while maintaining almost the same content protection as before.

This application claims the benefit of Japanese Patent Application No. 2005-235239, filed Aug. 15, 2005, which is hereby incorporated by reference herein in its entirety.

The invention claimed is:

1. An apparatus comprising:
  a controller that (a) generates second image data from first image data stored in a first storage device, (b) deletes the second image data from the first storage device to delete a part of the first image data from the first storage device, after the second image data is stored in a second storage device coupled to an external device, and (c) reconstructs third image data from the second image data stored in the second storage device and a remaining part of the first image data stored in the first storage device if the second image data stored in the second storage device is transferred from the external device to the apparatus; and
  a transfer unit that transfers the second image data to the external device.

2. The apparatus according to claim 1, wherein the second image data is generated from the first image data based on capability information of the external device.

3. The apparatus according to claim 1, wherein a resolution of the second image data is different from a resolution of the first image data.

4. The apparatus according to claim 1, wherein a frame rate of the second image data is different from a frame rate of the first image data.

5. The apparatus according to claim 1, wherein a resolution and a frame rate of the second image data are different from a resolution and a frame rate of the first image data.

6. The apparatus according to claim 1, wherein a resolution of the third image data corresponds to a resolution of the first image data.

7. The apparatus according to claim 1, wherein the external device is configured to act as a mobile device.

8. The apparatus according to claim 1, wherein the external device includes a mobile phone.

9. A method comprising:
  generating second image data from first image data stored in a first storage device;
  transferring the second image data to an external device;
  deleting the second image data from the first storage device to delete a part of the first image data from the first storage device, after the second image data is stored in a second storage device coupled to the external device; and
  reconstructing third image data from the second image data stored in the second storage device and a remaining part of the first image data stored in the first storage device if the second image data stored in the second storage device is transferred from the external device to an apparatus carrying out the method.

10. The method according to claim 9, wherein the second image data is generated from the first image data based on capability information of the external device.

11. The method according to claim 9, wherein a resolution of the second image data is different from a resolution of the first image data.

12. The method according to claim 9, wherein a frame rate of the second image data is different from a frame rate of the first image data.

13. The method according to claim 9, wherein a resolution and a frame rate of the second image data are different from a resolution and a frame rate of the first image data.

14. The method according to claim 9, wherein a resolution of the third image data corresponds to a resolution of the first image data.

15. The method according to claim 9, wherein the external device is configured to act as a mobile device.

16. The method according to claim 9, wherein the external device includes a mobile phone.

17. The apparatus according to claim 1, wherein the part of the first image data comprises DC component data of I-picture.

18. The method according to claim 9, wherein the part of the first image data comprises DC component data of I-picture.

19. The apparatus according to claim 1, wherein a resolution of the second image data is lower than a resolution of the first image data.

20. The apparatus according to claim 1, wherein a frame rate of the second image data is lower than a frame rate of the first image data.

21. The method according to claim 9, wherein a resolution of the second image data is lower than a resolution of the first image data.

22. The method according to claim 9, wherein a frame rate of the second image data is lower than a frame rate of the first image data.

* * * * *